(12) United States Patent
Christiansson et al.

(10) Patent No.: US 9,274,645 B2
(45) Date of Patent: Mar. 1, 2016

(54) TOUCH DETERMINATION WITH SIGNAL ENHANCEMENT

(75) Inventors: Tomas Christiansson, Torna-Hällestad (SE); Peter Juhlin, Lund (SE); Mats Petter Wallander, Lund (SE)

(73) Assignee: FLATFROG LABORATORIES AB, Lund (SE)

( * ) Notice: Subject to any disclaimer, the term of this patent is extended or adjusted under 35 U.S.C. 154(b) by 183 days.

(21) Appl. No.: 13/994,437

(22) PCT Filed: Dec. 13, 2011

(86) PCT No.: PCT/SE2011/051503
§ 371 (c)(1),
(2), (4) Date: Jun. 14, 2013

(87) PCT Pub. No.: WO2012/082055
PCT Pub. Date: Jun. 21, 2012

(65) Prior Publication Data
US 2013/0285968 A1     Oct. 31, 2013

Related U.S. Application Data

(60) Provisional application No. 61/423,273, filed on Dec. 15, 2010.

(30) Foreign Application Priority Data

Dec. 15, 2010    (SE) .................................... 1051323

(51) Int. Cl.
    *G06F 3/042*     (2006.01)
    *G06F 3/041*     (2006.01)

(52) U.S. Cl.
CPC .............. *G06F 3/0416* (2013.01); *G06F 3/042* (2013.01); *G06F 2203/04109* (2013.01)

(58) Field of Classification Search
CPC .................. G06F 3/042; G06F 3/0416; G06F 2203/04109
See application file for complete search history.

(56) References Cited

U.S. PATENT DOCUMENTS

| | | |
|---|---|---|
| 6,972,753 B1 | 12/2005 | Kimura et al. |
| 7,432,893 B2 | 10/2008 | Ma et al. |

(Continued)

FOREIGN PATENT DOCUMENTS

| | | |
|---|---|---|
| WO | WO 2009/048365 | 4/2009 |
| WO | WO 2009/077962 | 6/2009 |

(Continued)

OTHER PUBLICATIONS

Frank Natterer, "The Mathematics of Computerized Tomography," Society for Industrial and Applied Mathematics, 2001, 222 pages.

(Continued)

*Primary Examiner* — Robin Mishler
(74) *Attorney, Agent, or Firm* — Harness, Dickey & Pierce, P.L.C.

(57) ABSTRACT

Multi-touch sensitivity is enabled using a touch-sensitive apparatus comprising a panel for conducting signals from a plurality of incoupling points to a plurality of outcoupling points, thereby defining detection lines between pairs of incoupling and outcoupling points. Signal generators coupled to the incoupling points generate the signals, and signal detectors coupled to the outcoupling points generate an output signal indicative of one or more touches on the surface portion. A signal processor obtains the output signal which, if converted into a set of data samples of a given input format, enables a predetermined reconstruction algorithm to determine an interaction pattern on the surface portion. The signal processor generates, based on the output signal, a modified set of data samples in the given input format; and operates the predetermined reconstruction algorithm on the modified set of data samples so as to determine a modified interaction pattern on the surface portion.

24 Claims, 6 Drawing Sheets

(56) References Cited

U.S. PATENT DOCUMENTS

| | | |
|---|---|---|
| 2006/0114237 A1 | 6/2006 | Crockett et al. |
| 2007/0075648 A1 | 4/2007 | Blythe et al. |
| 2009/0153519 A1 | 6/2009 | Suarez et al. |

FOREIGN PATENT DOCUMENTS

| | | |
|---|---|---|
| WO | WO 2010/006882 | 1/2010 |
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/064983 | 6/2010 |
| WO | WO 2011/028169 | 3/2011 |
| WO | WO 2011/049511 | 4/2011 |
| WO | WO 2011/049512 | 4/2011 |
| WO | WO 2011/049513 | 4/2011 |
| WO | WO 2011/134865 | 11/2011 |
| WO | WO 2011/139213 | 11/2011 |
| WO | WO 2012/050510 | 4/2012 |
| WO | WO 2013/062471 | 5/2013 |

OTHER PUBLICATIONS

Kak et al, "Principles of Computerized Tomographic Imaging", (1999), The Institute of Electrical Engineers, Inc.

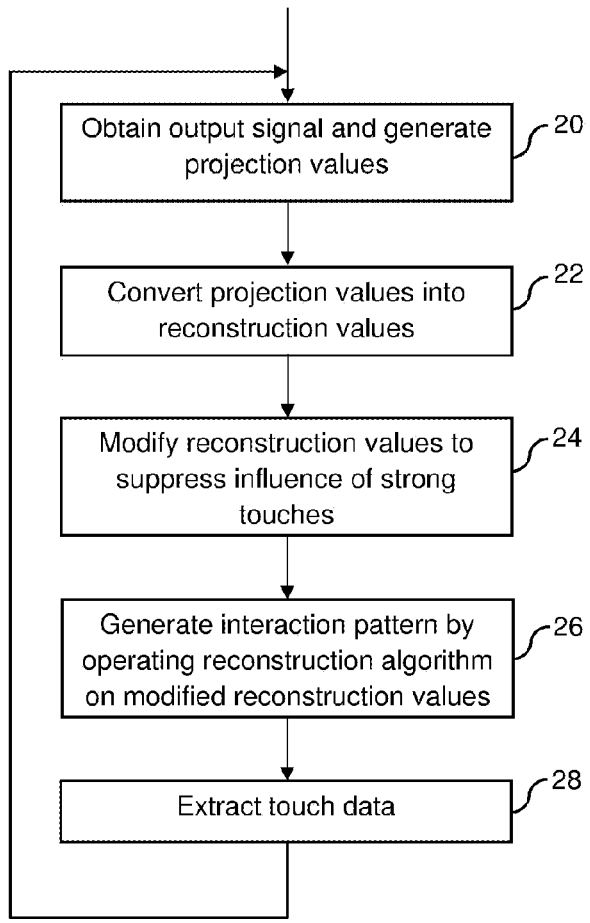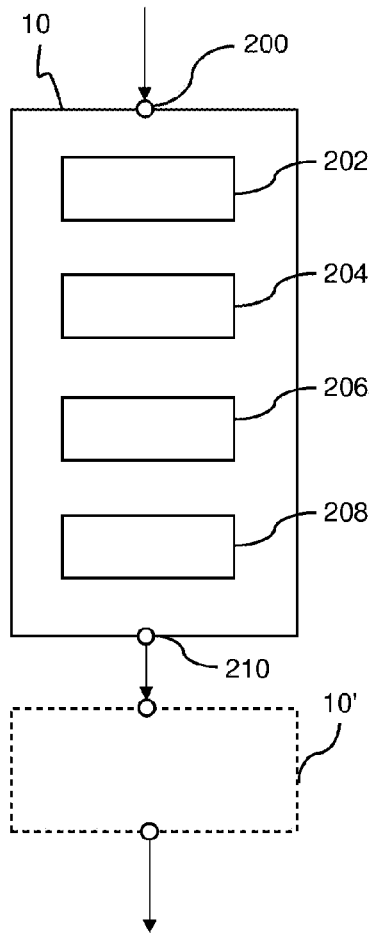
Fig. 3A　　　　　　　　　Fig. 3B
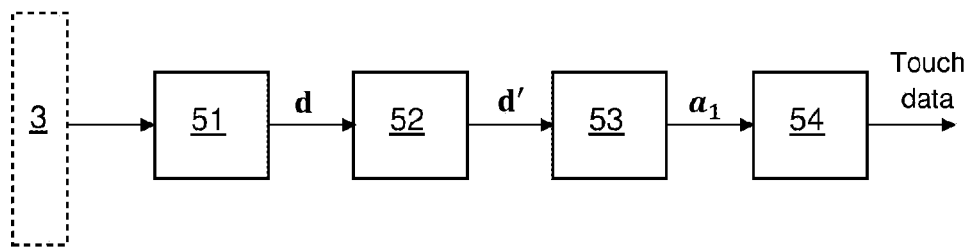
Fig. 5

TOUCH DETERMINATION WITH SIGNAL ENHANCEMENT

CROSS-REFERENCE TO RELATED APPLICATIONS

The present application claims the benefit of Swedish patent application No. 1051323-2, filed on Dec. 15, 2010, and U.S. provisional application No. 61/423,273, filed on Dec. 15, 2010, which are incorporated herein by reference.

TECHNICAL FIELD

The present invention relates to touch sensing systems and data processing techniques in relation to such systems.

BACKGROUND ART

Touch sensing systems ("touch systems") are in widespread use in a variety of applications. Typically, the touch sensing systems are actuated by a touch object such as a finger or stylus, either in direct contact, or through proximity (i.e. without contact), with a touch surface. Touch sensing systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

WO2010/064983 and WO2010/06882 disclose another type of multi-touch system which is based on frustrated total internal reflection (FTIR). Light sheets are coupled into a panel to propagate inside the panel by total internal reflection. When an object comes into contact with a touch surface of the panel, two or more light sheets will be locally attenuated at the point of touch. Arrays of light sensors are located around the perimeter of the panel to detect the received light for each light sheet. Data from the light sensors may be processed into logarithmic transmission values, which are input into an image reconstruction algorithm that generates a two-dimensional distribution of attenuation values over the touch surface. This enables determination of shape, position and size of multiple touches.

A similar type of multi-touch system is disclosed in WO2009/077962.

As the availability of multi-touch systems increases, and in particularly as these systems are made available in a wide range of sizes and enabling an increased number of simultaneous touches, it can be foreseen that software applications with advanced user interaction will be developed to be run on devices with these types of touch systems. For example, a user may be allowed to enter advanced multi-touch gestures or control commands, in which fingers on one or both hands are dragged across a touch surface, and it may be possible for several users to work concurrently on the touch surface, either in different application windows, or in a collaborative application window.

Irrespective of sensor technology, the touches need to be detected against a background of measurement noise and other interferences, e.g. originating from ambient light, fingerprints and other types of smear on the touch surface, vibrations, detection artifacts, etc. The influence of measurement noise and interferences may vary not only over time but also within the touch surface, making it difficult to properly detect the touches on the touch surface at all times. Furthermore, the degree of interaction between a touching object and the touch surface may vary both over time and between different objects. For example, the interaction may depend on if an object is tapped, dragged or held in a fixed position onto the touch surface. Different objects may yield different degree of interaction, e.g. the degree of interaction may vary between fingers of a user, and even more so between the fingers of different users.

The combination of several touches, complex gestures as well as temporal and spatial variations in degree of interaction, background, and noise will make the identification of touches a more demanding task. The user experience will be greatly hampered if, e.g., an ongoing gesture on a touch screen is interrupted by the system failing to detect certain touches during the gesture.

SUMMARY

It is an object of the invention to at least partly overcome one or more limitations of the prior art.

In view of the foregoing, one object is to enable a consistent user experience when interacting with a multi-touch system.

This and other objects, which may appear from the description below, are at least partly achieved by means of a method of enabling touch determination, a computer program product, a device for enabling touch determination, and touch-sensitive apparatuses according to the independent claims, embodiments thereof being defined by the dependent claims.

A first aspect of the invention is a method of enabling touch determination based on an output signal from a touch-sensitive apparatus. The touch-sensitive apparatus comprises a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal which is indicative of one or more touches present on the surface portion. The method comprises: obtaining the output signal which, if converted into a set of data samples of a given input format, enables a predetermined reconstruction algorithm to determine an actual interaction pattern on said surface portion; generating, based on the output signal, a modified set of data samples in said given input format; and operating the predetermined reconstruction algorithm on the modified set of data samples so as to determine a modified interaction pattern on said surface portion.

The first aspect may be used to increase the ability to detect multiple touches on the surface portion based on the output signal, since the modified set of data samples may be generated so as to facilitate touch data extraction in the resulting interaction pattern, e.g. by enhancing certain desired features in the interaction pattern. Such enhancement may e.g. aim at enhancing the appearance of weakly interacting touches compared to strongly interacting touches and/or reconstruction artifacts in the interaction pattern. An increased ability of multi-touch detection of a touch-sensing apparatus may be exploited to improve the user experience.

It should be realized that both of the actual interaction pattern and the modified interaction pattern are approximations of a true interaction pattern on the surface portion, and that the modified interaction pattern contains a deliberate and desired distortion aimed at enhancing certain features in the interaction pattern. The desired distortion of the resulting interaction pattern is caused by manipulating the input data to the reconstruction algorithm.

In one embodiment, the modified interaction pattern represents an enhancement of weakly interacting touches over strongly interacting touches in the actual interaction pattern.

In one embodiment, each interaction pattern comprises a distribution of interaction values within at least part of the surface portion, wherein each of the interaction values indicates a local attenuation of energy.

In one embodiment, said set of data samples represents an actual degree of interaction between one or more touches on the surface portion and the detection lines, and the step of generating the modified set of data samples comprises: actively modifying the actual degree of interaction for at least part of the detection lines. The modifying may comprise: changing the mutual relation in the actual degree of interaction among the different detection lines, and/or relatively decreasing the actual degree of interaction for the detection lines with the highest actual degree of interaction.

In one embodiment, the step of generating the modified set of data samples comprises: obtaining, based on the output signal, a magnitude value for each detection line; and applying a predetermined re-scaling function to the magnitude value for the detection lines. The re-scaling function may be non-linear and have a decreasing derivate with increasing magnitude value, at least for non-negative magnitude values. Alternatively or additionally, the re-scaling function may be defined by a set of control parameters, and the method may comprise a step of setting at least one of the control parameters based on the magnitude values for the detection lines.

In one embodiment, the method further comprises: obtaining, based on the output signal, a magnitude value for each detection line; obtaining a reference interaction pattern on the surface portion; identifying a location of a strongly interacting touch in the reference interaction pattern; identifying a set of detection lines intersecting said location; and actively modifying the magnitude values for the set of detection lines.

The step of generating the modified set of data samples may comprise at least one of: changing the magnitude values for the set of intersecting detection lines by a predetermined amount or fraction, setting the magnitude values for the set of intersecting detection lines to a predefined value according to a predefined criterion, and decreasing the magnitude values for the set of intersecting detection lines by an estimated contribution of the strongly interacting touches. Alternatively or additionally, the step of obtaining the reference interaction pattern may comprise: operating the reconstruction algorithm on the set of data samples so as to generate the actual interaction pattern, and obtaining the reference interaction pattern based on the actual interaction pattern. Alternatively or additionally, the step of identifying the set of intersecting detection lines may comprise: accessing a data structure that links regions on the surface portion to the detection lines that intersect the regions. Alternatively or additionally, each detection line may be defined by first and second dimension values in a two-dimensional sample space, wherein the first and second dimension values may define the location of the detection line on the surface portion, and wherein the step of identifying the set of intersecting detection lines may comprise: mapping the location of the strongly interacting touch to a predetermined curve in the sample space, and identifying the set of intersecting detection lines by intersecting the predetermined curve with the detection lines as mapped to the sample space.

In one embodiment, the magnitude values for the detection lines indicate a degree of interaction between one or more touches on the surface portion and the detection lines.

In one embodiment, the magnitude values for the detection lines represent the set of data samples. Thus, if provided in or converted to the input format, the magnitude values would form the set of data samples, which in turn would result in the actual interaction pattern. The deliberate modification of the magnitude values, according to the various embodiments of the invention, enables generation of the modified set of data samples and the modified interaction pattern.

In one embodiment, the method repeatedly executes a sequence of steps comprising: the step of obtaining the output signal, the step of generating the modified set of data samples, and the step of operating the reconstruction algorithm on the modified set of data samples, a step of determining touch data based on the modified interaction pattern, and a step of outputting the touch data.

In one embodiment, the output signal represents detected signal energy on the respective detection lines.

In one embodiment, said input format represents a decrease in signal energy caused by interaction between one or more touches on the surface portion and one of the detection lines.

In one embodiment, said input format is represented by a function of detected signal energy for the respective detection line normalized by a reference value, wherein the reference value represents the detected signal energy on the respective detection line without touches on the surface portion. The input format may be given by operating a logarithm function on the detected signal energy for the respective detection line normalized by the reference value.

In one embodiment, the predetermined reconstruction algorithm is designed for tomographic reconstruction based on data in said input format.

The modified interaction pattern may be generated as a distorted version of an actual interaction pattern that represents changes in interaction on any time scale. In one example, the actual interaction pattern represents changes with respect to a clean touch surface without touches, such that all interaction essentially originates from a current presence of touches on the surface portion. In another example, the actual interaction pattern represents changes on a shorter time scale, e.g. interaction changes between a current execution of the method steps and a preceding execution of the method steps.

A second aspect of the invention is a computer program product comprising computer code which, when executed on a data-processing system, is adapted to carry out the method of the first aspect.

A third aspect of the invention is a device for enabling touch determination based on an output signal from a touch-sensitive apparatus. The touch-sensitive apparatus comprises a panel configured to conduct signals from a plurality of incoupling points to a plurality of outcoupling points, thereby defining detection lines that extend across a surface portion of the panel between pairs of incoupling and outcoupling points, signal generating means coupled to the incoupling points to generate the signals, and signal detecting means coupled to the outcoupling points to generate the output signal which is indicative of one or more touches present on the surface portion. The device comprises: means for obtaining the output signal which, if converted into a set of data samples of a given input format, enables a predetermined reconstruction algorithm to determine an actual interaction pattern on said surface portion; means for generating, based on the output signal, a modified set of data samples in said given input format; and means for operating the predetermined reconstruction algorithm on the modified set of data samples so as to determine a modified interaction pattern on said surface portion.

A fourth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; means for generating the signals at the incoupling points; means for generating an output signal based on detected signals at the outcoupling points, the output signal being indicative of one or more touches present on the surface portion; and the device according to the third aspect.

A fifth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; at least one signal generator coupled to the incoupling points to generate the signals; at least one signal detector coupled to the outcoupling points to generate an output signal which is indicative of one or more touches present on the surface portion. The touch-sensitive apparatus further comprises a signal processor connected to receive the output signal and configured to: obtain the output signal which, if converted into a set of data samples of a given input format, enables a predetermined reconstruction algorithm to determine an actual interaction pattern on said surface portion; generate, based on the output signal, a modified set of data samples in said given input format; and operate the predetermined reconstruction algorithm on the modified set of data samples so as to determine a modified interaction pattern on said surface portion.

Any one of the embodiments of the first aspect can be combined with the second to fifth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 3A is a flow chart of a reconstruction method, and FIG. 3B is a block diagram of a device that implements the method of FIG. 3A.

FIG. 5 is a block diagram of a structure for implementing a first embodiment of data processing.

DETAILED DESCRIPTION OF EXAMPLE EMBODIMENTS

Figure 1:
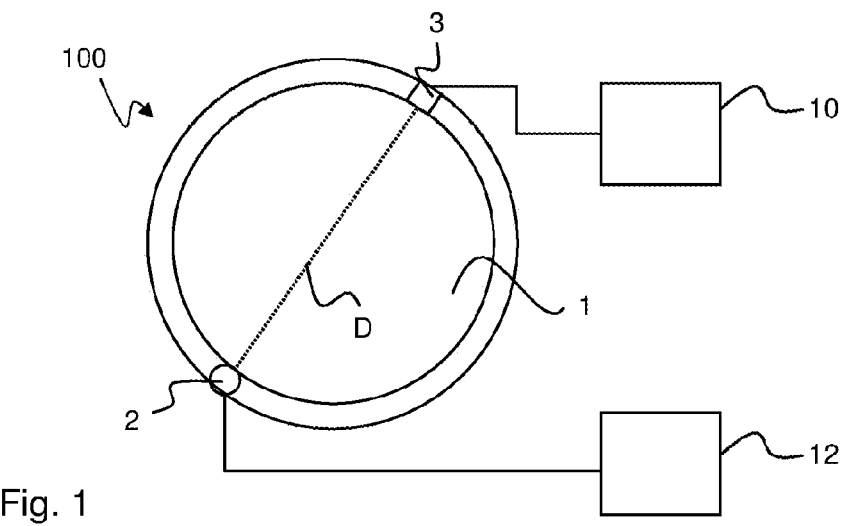
FIG. 1 is a plan view of a touch-sensitive apparatus.

The present invention relates to techniques for enabling extraction of touch data for multiple objects in contact with a touch surface of a touch-sensitive apparatus. The description starts by presenting the underlying concept of such a touch-sensitive apparatus, especially an apparatus operating by frustrated total internal reflection (FTIR) of light. The description continues to present embodiments for suppressing strong touches in interaction patterns generated by processing of signals obtained from a touch-sensitive apparatus. Finally, detailed examples are given.

Throughout the description, the same reference numerals are used to identify corresponding elements.

1. Touch-Sensitive Apparatus

FIG. 1 illustrates a touch-sensitive apparatus 100 which is based on the concept of transmitting energy of some form across a touch surface 1, such that an object that is brought into close vicinity of, or in contact with, the touch surface 1 causes a local decrease in the transmitted energy. The touch-sensitive apparatus 100 includes an arrangement of emitters and sensors, which are distributed along the periphery of the touch surface 1. Each pair of an emitter and a sensor defines a detection line, which corresponds to the propagation path for an emitted signal from the emitter to the sensor. In FIG. 1, only one such detection line D is illustrated to extend from emitter 2 to sensor 3, although it should be understood that the arrangement typically defines a dense grid of intersecting detection lines, each corresponding to a signal being emitted by an emitter and detected by a sensor. Any object that touches the touch surface along the extent of the detection line D will thus decrease its energy, as measured by the sensor 3. Thus, a touch on the touch surface 1 by an object results in an attenuation of one or more detection lines.

The arrangement of sensors 3 is electrically connected to a signal processor 10, which samples and processes an output signal from the arrangement. The output signal is indicative of the received energy at each sensor 3. As will be explained below, the signal processor 10 may be configured to process the output signal so as to recreate an image of the distribution of interaction values (for simplicity, referred to as an "interaction pattern" or "attenuation field" in the following) across the touch surface 1. The interaction pattern may be further processed by the signal processor 10 or by a separate device (not shown) for touch determination, which may involve extraction of touch data, such as a position (e.g. x, y coordinates), a shape or an area of each touching object.

In the example of FIG. 1, the touch-sensitive apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. One or both of the signal processor 10 and the controller 12 may be at least partially implemented by software executed by a processing unit.

Generally, the touch-sensitive apparatus 100 (the touch surface 1) may be of any shape, such as circular, elliptical or polygonal, including rectangular. The touch-sensitive apparatus 100 may be designed to be used with a display device or monitor, e.g. as described in the Background section.

The touch-sensitive apparatus 100 may be configured to permit transmission of energy in one of many different forms. The emitted signals may thus be any radiation or wave energy that can travel in and across the touch surface 1 including, without limitation, light waves in the visible or infrared or ultraviolet spectral regions, electrical energy, electromagnetic or magnetic energy, or sonic and ultrasonic energy or vibration energy.

Figure 2A:
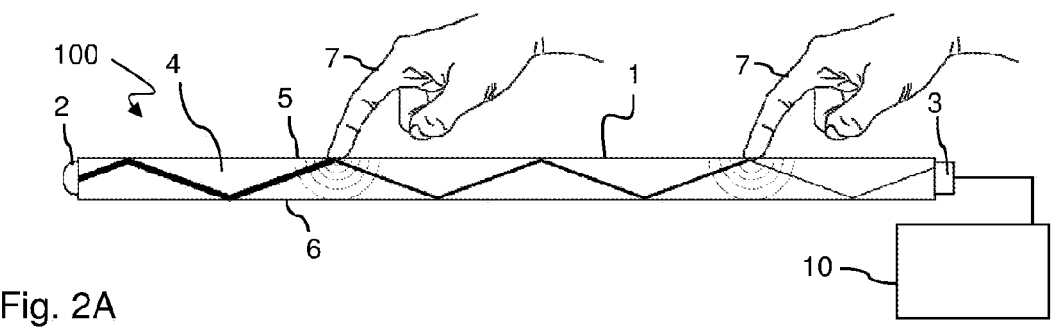
FIGS. 2A-2B are side and top plan views of touch-sensitive systems operating by frustrated total internal reflection (FTIR).

In the following, an example embodiment based on propagation of light will be described. FIG. 2A is a side view of a touch-sensitive apparatus 100 which includes a light transmissive panel 4, one or more light emitters 2 (one shown) and one or more light sensors 3 (one shown). The panel 4 defines two opposite and generally parallel surfaces 5, 6 and may be planar or curved. A radiation propagation channel is provided between two boundary surfaces 5, 6 of the panel 4, wherein at least one of the boundary surfaces allows the propagating light to interact with a touching object 7. Typically, the light from the emitter(s) 2 propagates by total internal reflection (TIR) in the radiation propagation channel, and the sensors 3 are arranged at the periphery of the panel 4 to generate a respective measurement signal which is indicative of the energy (or equivalently, the power or intensity) of received light.

As shown in FIG. 2A, the light may be coupled into and out of the panel 4 directly via the edge portion that connects the top and bottom surfaces 5, 6 of the panel 4. Alternatively, not shown, a separate coupling element (e.g. in the shape of a wedge) may be attached to the edge portion or to the top or bottom surface 5, 6 of the panel 4 to couple the light into and/or out of the panel 4. When the object 7 is brought sufficiently close to the boundary surface, part of the light may be scattered by the object 7, part of the light may be absorbed by the object 7, and part of the light may continue to propagate in the panel 4. Thus, when the object 7 touches a boundary surface of the panel (e.g. the top surface 5), the total internal reflection is frustrated and the energy of the transmitted light is decreased. This type of touch-sensitive apparatus is denoted "FTIR system" (FTIR—Frustrated Total Internal Reflection) in the following.

Figure 2B:
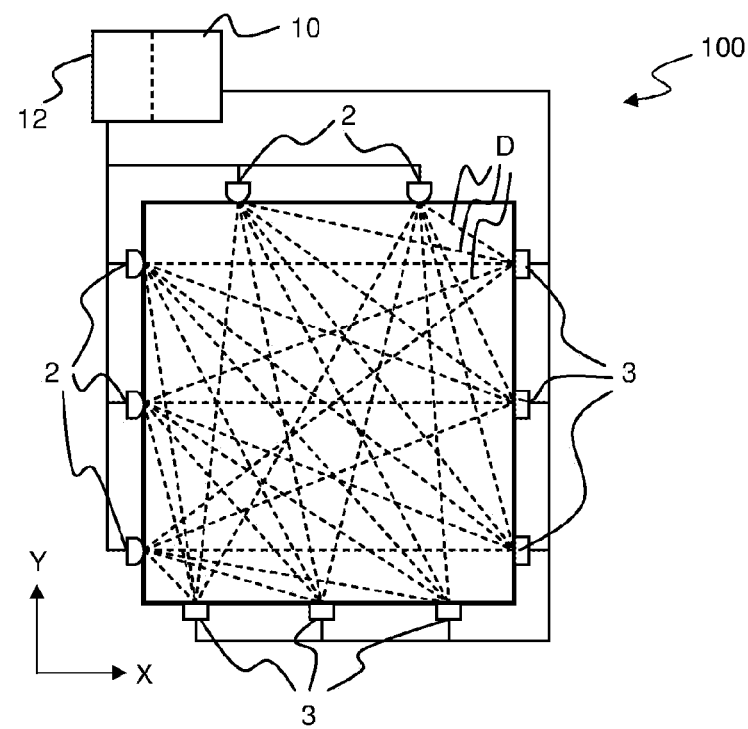

The touch-sensitive apparatus 100 may be operated to measure the energy of the light transmitted through the panel 4 on a plurality of detection lines. This may, e.g., be done by activating a set of spaced-apart emitters 2 to generate a corresponding number of light sheets inside the panel 4, and by operating a set of sensors 3 to measure the transmitted energy of each light sheet. Such an embodiment is illustrated in FIG. 2B, where each emitter 2 generates a beam of light that expands in the plane of the panel 4 while propagating away from the emitter 2. Each beam propagates from one or more entry or incoupling points on the panel 4. Arrays of light sensors 3 are located around the perimeter of the panel 4 to receive the light from the emitters 2 at a number of spaced-apart outcoupling points on the panel 4. It should be understood that the incoupling and outcoupling points merely refer to the position where the beam enters and leaves, respectively, the panel 4. Thus, one emitter/sensor may be optically coupled to a number of incoupling/outcoupling points. In the example of FIG. 2B, however, the detection lines D are defined by individual emitter-sensor pairs. This implementation and further variants are disclosed in more detailed in Applicant's WO2010/064983, which is incorporated herein in its entirety by this reference.

It is to be understood that FIG. 2 merely illustrates one example of an FTIR system. For example, the detection lines may instead be generated by sweeping or scanning one or more beams of light inside the panel. Such and other examples of FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, and WO2011/134865, which are all incorporated herein by this reference. The inventive concept may be advantageously applied to such alternative FTIR systems as well.

Irrespective of implementation, the light sensors 3 collectively provide an output signal, which is received and sampled by the signal processor 10. The output signal contains a number of sub-signals, also denoted "projection signals", each representing the energy of light emitted by a certain light emitter 2 and received by a certain light sensor 3, i.e. the received energy on a certain detection line. Depending on implementation, the signal processor 10 may need to process the output signal for separation of the individual projection signals.

2. Modification of Data for Suppressing Strong Touches

In its various aspects, the invention relates to a touch determination technique that is able to detect multiple touches on the touch surface, even if the touches have different degrees of interaction with the detection lines, e.g. even if one or more touches result in a significantly stronger attenuation of the propagating light in an FTIR system compared to one or more other touches. In various embodiments, this ability for improved touch determination is achieved by active modification of a distribution of magnitude values obtained from the projection signals, where each magnitude value directly or indirectly represents the degree of interaction between the touches and a respective detection line.

As will be further explained below, the active modification may operate directly on the values (also denoted "projection values") of the projection signals, on values (also denoted "reconstruction values") of reconstruction signals which are obtained by processing the projection signals and which are adapted for input to a reconstruction algorithm/process, or on values (also denoted "intermediate values") of any type of intermediate signals obtained by processing the projection signals.

FIG. 3A illustrates an embodiment of a method for reconstruction and touch data extraction in a touch-sensitive apparatus, such as the above-described FTIR system. In the illustrated embodiment, the active modification operates on the above-mentioned reconstruction signals.

The method involves a sequence of steps 20-28 that are repeatedly executed, typically by the signal processor 10 (FIGS. 1-2). In the context of this description, each sequence of steps 20-28 is denoted a sensing instance.

Each sensing instance starts by a data collection step 20, in which measurement values are obtained from the light sensors 3 in the FTIR system, typically by sampling a value from each of the aforesaid projection signals. The data collection step 20 results in one projection value for each detection line. It may be noted that the data may, but need not, be collected for all available detection lines in the FTIR system. The data collection step 20 may also include pre-processing of the measurement values, e.g. filtering for noise reduction.

In a conversion step 22, the projection values are processed for conversion into the above-mentioned reconstruction values, which are given in a format adapted to the reconstruction algorithm that is used (in the reconstruction step 26, below)

for generating the interaction pattern. It should be emphasized that the format of the reconstruction values depends on (or is given by) the type of reconstruction algorithm, and the format typically represents the decrease in signal energy caused by the interaction between touches and detection lines. In the detailed examples below, the format is given as the (negative) logarithm of the signal transmission for the detection line, the signal transmission being given by the projection value normalized by a reference value (see below). In alternative implementations, the format may be given as a transmission (e.g. given by the projection value normalized by the reference value), an attenuation (e.g. given by 1−transmission), an energy difference (e.g. given by the difference between the projection value and the reference value), or a logarithm of the attenuation or the energy difference. As used hereinabove, a "logarithm" is intended to also encompass functions approximating a true logarithmic function, in any base. Furthermore, all of the above conversion functions may have any sign, i.e. they may or may not be multiplied by a negative value.

Depending on the reconstruction algorithm, it may be possible to omit the conversion step 22, whereby the reconstruction values are equal to the projection values.

In a modification step 24, the reconstruction values are processed to suppress the influence of strong touches compared to weak touches. This may be seen as a process of changing the dynamics of the ensemble of reconstruction values, i.e. the relation between the reconstruction values for different detection lines, so as to suppress strongly interacting touches in the interaction pattern to be reconstructed. Thus, the modification step 24 generates a modified set of reconstruction values, by actively modifying the relative distribution of reconstruction values among the detection lines. As will be explained further below with reference to detailed examples, this may be achieved in different ways, e.g. by applying a re-scaling function to the reconstruction values, or by identifying strongly interacting touches in a reference pattern and actively modifying the reconstruction values only for those detection lines that are deemed affected by these strongly interacting touches. In the following, the modified set of reconstruction values is also referred to as "modified reconstruction values", although it is to be understood that only part of the reconstruction values may need to be modified.

In a reconstruction step 26, the interaction pattern on the touch surface is reconstructed by processing the modified reconstruction values that are derived in the modification step 24. The interaction pattern is a distribution of interaction values across the touch surface (or a relevant part of the touch surface). Each interaction value typically represents a local attenuation of energy in a specific position or reconstruction cell (pixel) on the touch surface.

Here, it is important to understand that the reconstruction algorithm is adapted to operate on reconstruction values in a specific format, which means that the reconstruction values are obtained from the projection values according to a predetermined function or algorithm. The reconstruction values may, but need not, be correct (at least in an approximation) in view of the physical model that underlies the reconstruction algorithm. The format fits to the reconstruction algorithm to such an extent that the reconstruction algorithm, if operated on the reconstruction values, yields an interaction pattern which is a better representation of the "true" interaction pattern than the interaction pattern obtained by operating the reconstruction algorithm on the modified reconstruction values. Therefore, in the context of the present disclosure, the former interaction pattern is denoted "actual interaction pattern" and the latter interaction pattern is denoted "modified interaction pattern" or "distorted interaction pattern". However, it should be understood that the actual interaction pattern may deviate, even significantly, from the true interaction pattern, e.g. as a result of measurement or processing noise, inaccuracy or non-linearity in signal detection, intentional or unintentional simplifications in the physical model and/or reconstruction algorithm, etc.

Any available reconstruction algorithm may be used in the reconstruction step 26, including tomographic reconstruction methods such as Filtered Back Projection, FFT-based algorithms, ART (Algebraic Reconstruction Technique), SART (Simultaneous Algebraic Reconstruction Technique), etc. Alternatively, the reconstruction algorithm may generate the interaction pattern by adapting one or more basis functions to the reconstruction values and/or by statistical methods such as Bayesian inversion. Examples of such reconstruction algorithms designed for use in touch determination are found in WO 2010/006883, WO2009/077962, WO2011/049511, WO2011/139213, PCT/SE2011/051201 filed on Oct. 7, 2011 and US61/552,024 filed on Oct. 27, 2011, all of which are incorporated herein by reference. Conventional reconstruction methods are found in the mathematical literature, e.g. "The Mathematics of Computerized Tomography" by Natterer, and "Principles of Computerized Tomographic Imaging" by Kak and Slaney.

The interaction pattern may be reconstructed within one or more subareas of the touch surface. The subareas may be identified by analyzing intersections of detection lines across the touch surface, based on the above-mentioned projection signals. Such a technique for identifying subareas is further disclosed in WO2011/049513, which is incorporated herein by this reference.

In a subsequent extraction step 28, the modified interaction pattern is processed for identification of touch-related features and extraction of touch data. Any known technique may be used for isolating touches within the modified interaction pattern. For example, ordinary blob detection and tracking techniques may be used for finding the touches. In one embodiment, a threshold is first applied to the modified interaction pattern, to remove noise. Any areas with interaction values that fall below or above (depending on implementation) the threshold may be further processed to find the center and shape by fitting for instance a two-dimensional second-order polynomial or a Gaussian bell shape to the interaction values, or by finding the ellipse of inertia of the interaction values. There are also numerous other techniques as is well known in the art, such as clustering algorithms, edge detection algorithms, standard blob detection, water shedding techniques, flood fill techniques etc.

Any available touch data may be extracted, including but not limited to x,y coordinates, areas, shapes and/or pressure of the touches.

After step 28, the extracted touch data is output, and the process returns to the data collection step 20.

It is important to notice that several variations of the embodiment in FIG. 3A are possible. The aim of the modification step 24 is to produce the modified reconstruction values to be input to the reconstruction algorithm in step 26. In a variant, the modification step 24 is included between the data collection step 20 and the conversion step 22, so as to modify the projection values before the conversion step 22, which then may directly generate the modified reconstruction values based on the modified projection values. In a similar variant, the modification step 24 is included in the data collection step 20, which thereby produces the modified set of projection values. In another variant, the modification step 24 is included in the conversion step 22, which thereby directly generates the modified reconstruction values. Combinations of the above variants are also conceivable, i.e. that the touch determination process includes plural modification steps that collectively operate to generate the modified reconstruction values. When the modification step is "included in" another step, the modification step is embedded among other functional operations and, structurally, the modification is not a separate step of the method. However, functionally, the method includes a modification step.

With reference to the embodiment of FIG. 3A, and variants thereof, it is to be understood that one or more of steps 20-28 may be effected concurrently. For example, the data collection step 20 of a subsequent sensing instance may be initiated concurrently with any one of steps 22-28.

The method for reconstruction and touch data extraction may be executed by a data processing device (cf. signal processor 10 in FIGS. 1-2) which is connected to obtain the measurement values from the light sensors 3 in the FTIR system. FIG. 3B shows an example of such a data processing device 10 for implementing the method in FIG. 3A. In the illustrated example, the device 10 includes an input 200 for receiving the output signal. The device 10 further includes a data collection element (or means) 202 for processing the output signal to generate the projection values, a conversion element (or means) 204 for converting the projection values into reconstruction values, a modification element (or means) 206 for modifying the reconstruction values, a reconstruction element (or means) 208 for generating the modified interaction pattern, and an output 210 for outputting the modified interaction pattern. In the example of FIG. 3B, the actual extraction of touch data is carried out by a separate device 10' which is connected to receive the modified interaction pattern from the data processing device 10.

The data processing device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/ means when executing another instruction. In addition, one element/means may be implemented by one instruction in some cases, but by a plurality of instructions in some other cases. Naturally, it is conceivable that one or more elements (means) are implemented entirely by analog hardware components.

The software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The data processing device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc., as well as one or more data acquisition devices, such as an A/D converter. The special-purpose software may be provided to the data processing device 10 on any suitable computer-readable medium, e.g. a record medium or a read-only memory.

3. Choice of Reconstruction Values

As noted above, the format of the reconstruction values is determined by the type of reconstruction algorithm. Many tomographic reconstruction algorithms are designed to reconstruct an attenuation field, i.e. each interaction value in the reconstructed interaction pattern represents a local attenuation of energy by an attenuating medium.

Reverting to the FTIR system in FIG. 2A, the light will not be blocked by the touching object 7. Thus, if two objects 7 happen to be placed after each other along a light path from an emitter 2 to a sensor 3, both objects 7 will interact with the propagating light. Provided that the light energy is sufficient, a remainder of the light will reach the sensor 3 and generate an output signal that allows both interactions (touches) to be identified. Thus, in multi-touch FTIR systems, the transmitted light may carry information about a plurality of touches.

In the following, $T_k$ is the transmission for the k:th detection line $D_k$, $T_v$ is the transmission at a specific position along the detection line $D_k$, and $A_v$ is the relative attenuation at the specific position. The total transmission (modeled) along a detection line is thus:

$$T_k = \prod_v T_v = \prod_v (1 - A_v)$$

The above equation is suitable for analyzing the attenuation caused by discrete objects on the touch surface, when the points are fairly large and separated by a distance. However, a more correct definition of attenuation through an attenuating medium may be used:

$$I_k = I_{0,k} \cdot (e^{-\int a(x)dx}) \rightarrow T_k = I_k/I_{0,k} = e^{-\int a(x)dx}$$

In this formulation, $I_k$ represents the transmitted energy on detection line $D_k$ with attenuating object(s), $I_{0,k}$ represents the transmitted energy on detection line $D_k$ without attenuating objects, and $a(x)$ is the attenuation coefficient along the detection line $D_k$. In this formulation, the detection line is assumed to interact with the touch surface along the entire extent of the detection line, i.e. the detection line is represented as a mathematical line.

It is thus realized that a tomographic reconstruction model may be designed to operate on transmission data for the detection lines. Such transmission data may be obtained by dividing the projection values by a respective background or reference value. By proper choice of background values, the projection values are thereby converted into transmission values, which thus represent the fraction (e.g. in the range [0, 1]) of the available light energy that has been measured on each of the detection lines. The background signal may be pre-set (e.g. by factory calibration), derived during a separate calibration step before or after the touch determination process, or derived from the projection values acquired during one or more preceding sensing instances without any objects touching the panel, possibly by averaging a set of such projection values. For more advanced techniques of generating the background values, in which the background values are selectively updated by analyzing the projection values obtained during the touch determination process (cf. FIG. 3A), reference is made to WO2011/028169 and WO2011/049512, which are incorporated herein by reference.

Certain tomographic reconstruction techniques, such as Filtered Back Projection (FBP) are based on the theory of the Radon transform which deals with line integrals. Such reconstruction techniques may therefore be designed to operate on reconstruction values $d_k$ that are given by the negative logarithm of the transmission:

$$d_k = -\log(T_k) = -\log(e^{-\int a(x)dx}) = \int\int a(x)dx$$

In a variant, the reconstruction values $d_k$ may be given by any known approximation of this conversion function. A simple approximation of $-\log(T_k)$, which is a good approximation for $T_k$ close to 1 and may be useful also for smaller values of $T_k$, is given by $d_k = 1 - T_k$.

4. Detailed Examples

In this section, two main approaches to generate modified reconstruction values will be exemplified in greater detail.

Figure 4A:
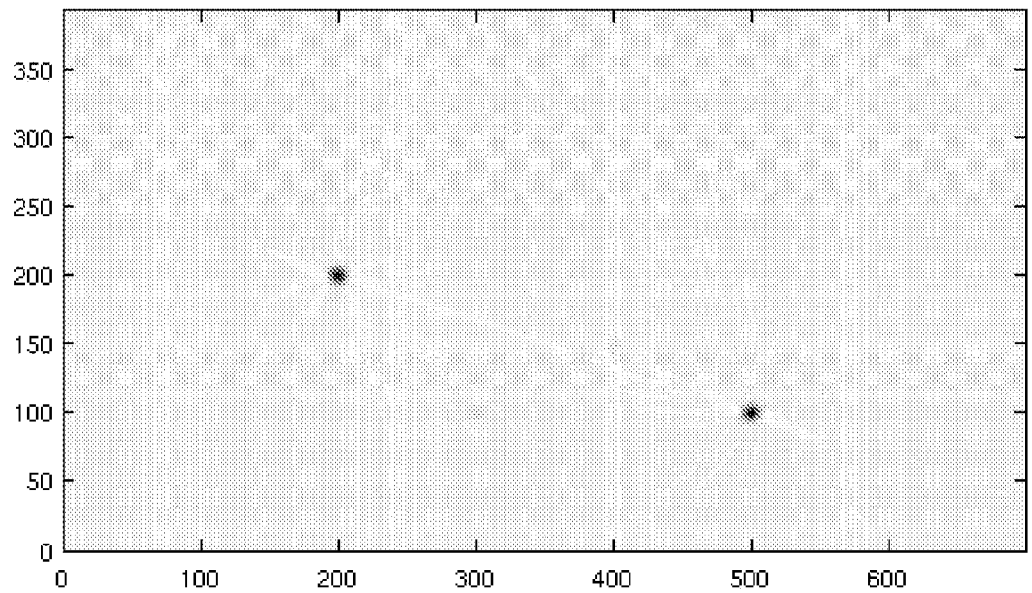
FIG. 4A illustrates an actual interaction pattern obtained by reconstruction processing.
Figure 4B:
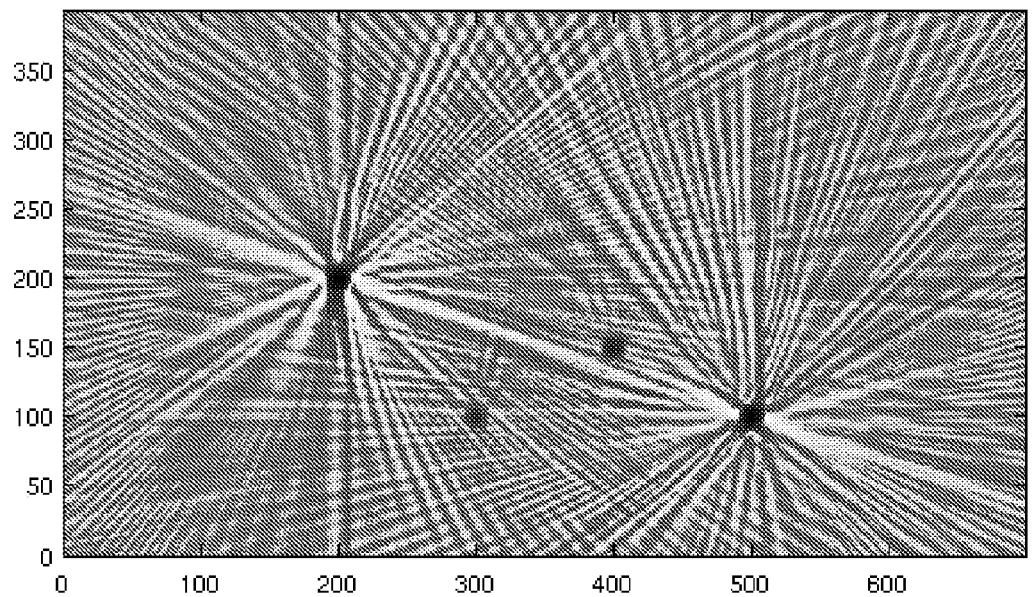
FIG. 4B illustrates the actual interaction pattern in FIG. 4A after scaling to enhance weak signal features.

The performance improvement of the respective approach is illustrated by comparison to an interaction pattern which is obtained by operating a tomographic reconstruction algorithm on reconstruction values obtained by converting a given set of projection values via $-\log(T_k)$. The projection values represent received light energy in an FTIR system of the type shown in FIG. 2B. FIG. 4A illustrates the resulting (actual) interaction pattern in the coordinate system of touch surface, where dark areas indicate high attenuation. FIG. 4A has been generated by autoscaling the interaction pattern between minimum and maximum values. From FIG. 4A, it appears as if there are only two touches in the actual interaction pattern. However, the set of projection signals are actually generated with four objects on the touch surface, but with two of the objects resulting in a significantly weaker interaction (a factor of 10) than the other two objects. In FIG. 4B, the interaction pattern in FIG. 4A has been re-scaled to enhance weak features. Here, the two weakly interacting touches may be discerned in between the strongly interacting touches. It is seen that the interaction values of the weakly interacting touches are partially concealed by artifacts caused by the strongly interacting touches. In the example of FIG. 4B, the artifacts include star-like streaks emanating from the strongly interacting touches. For example, artifacts may originate from a local deformation of the touch surface caused by the touching objects, and/or they may result from an inability of the reconstruction algorithm to accurately reproduce the true interaction pattern.

To further explain the origin of artifacts, assume that the reconstruction values, d, depend on an attenuation field, a, on the touch surface according to a projection function $\mathcal{P}$, which reflects the properties of the physical touch system:

$$d = \mathcal{P}(a).$$

The reconstruction step (cf. step 26 in FIG. 3A) is aimed at reconstructing the attenuation field $a_0$ (an approximation of the true interaction pattern a) from the reconstruction values d, using a reconstruction function $\mathcal{P}'$:

$$a_0 = \mathcal{P}'(d).$$

Typically, the reconstruction function $\mathcal{P}'$ is not the exact inverse of the projection function $\mathcal{P}$. One reason may be that certain properties of the physical touch system may be difficult and/or computationally expensive to include in $\mathcal{P}'$. Another reason may be that $\mathcal{P}'$ is based on mathematical principles that do not allow a perfect reconstruction. In either case, the reconstructed interaction pattern $a_0$ will contain artifacts. Typically, strong touches will introduce stronger artifacts than weak ones, and this is certainly the case if $\mathcal{P}'$ is a linear function of d. If the touch system is exposed to touches that differ significantly in interaction strength, even by one or several orders of magnitude, there is a significant risk that artifacts from a strongly interacting touch might conceal a weakly interacting touch. Furthermore, the presence of significant noise levels may make identification of weakly interacting touches even more difficult.

4.1. Use of a Re-Scaling Function

One main approach to enhance weakly interacting touches over strongly interacting touches in the interaction pattern, is to apply a re-scaling function that reduces the dynamics between strong and weak touches in the reconstruction values that are fed to the reconstruction algorithm. As noted above, the re-scaling function may be applied to modify the reconstruction values, the projection values, or some intermediate values used in the touch determination process (cf. FIG. 3A). In the following examples, it is assumed that the re-scaling function is applied to modify the reconstruction values of the different detection lines.

FIG. 5 is a schematic block diagram of a processing structure for determining touch data that implements such a re-scaling function. The processing structure comprises a block 51 which obtains the output signal from the light sensors 3 and generates a set d of reconstruction values for the different detection lines. A block 52 applies the re-scaling function to the projection values to generate a modified set d' of reconstruction values for the detection lines. A block 53 operates a reconstruction algorithm on the modified reconstruction values to generate a modified interaction pattern $a_1$. A block 54 operates on the modified interaction pattern $a_1$ to determine touch data, which is output for downstream processing or other use.

In this example, the re-scaling function, $f$, is applied to each individual reconstruction value before doing the reconstruction:

$$a_1 = \mathcal{P}'(f(d)).$$

Here $f$ is a function which applies the re-scaling function $f$ element-wise to the reconstruction values in d, to generate the modified reconstruction values d'. The re-scaling function $f$ will typically be a non-linear monotonically increasing function with a decreasing rate of increase, i.e. the derivative of the function decreases with increasing reconstruction value.

Figure 6A:
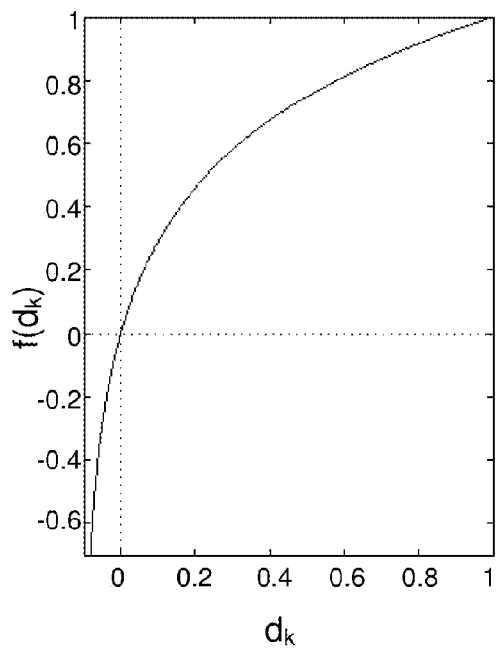
FIG. 6A-6C are graphs of different re-scaling functions for use upstream of the reconstruction algorithm in the first embodiment.
Figure 6B:
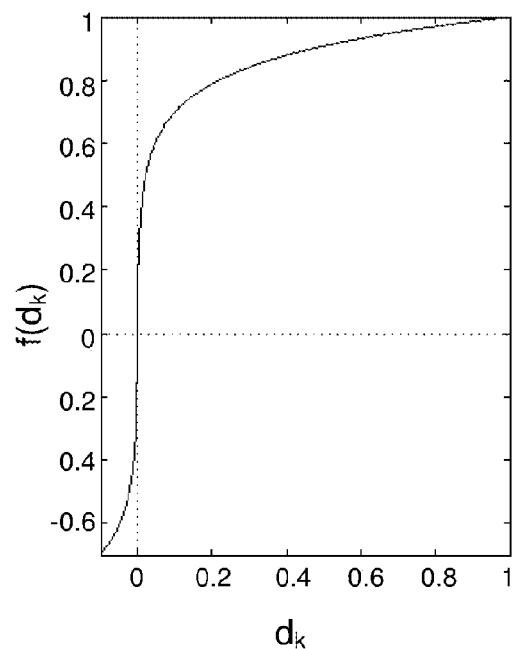
Figure 6C:
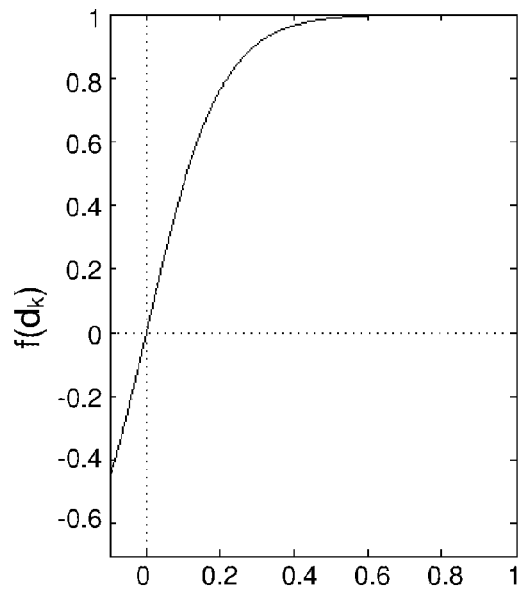

FIGS. 6A-6C illustrate three examples of suitable re-scaling functions $f$. FIG. 6A is a graph of a logarithm-based function, $f_l(d_k) = \delta \cdot \log(1 + \gamma d_k)$, FIG. 6B is a graph of a re-scaling function based on the inverse hyperbolic sine function, $f_a(d_k) = \delta \cdot a \sin h(\gamma d_k)$, and FIG. 6C is a graph of a re-scaling function based on a sigmoid function (the logistic function), $$f_s(d_k) = \delta \cdot \left( \frac{2}{1 + e^{-\gamma d_k}} - 1 \right).$$

All of these re-scaling functions are approximately linear close to $d_k=0$, and the parameter $\gamma$ controls how soon (when $d_k$ increases from 0) the re-scaling function becomes significantly non-linear with the effect of scaling down large values of $d_k$. In the graphs of FIGS. 6A-6C, the control parameter γ was set to 10, 1000 and 10, respectively. The parameter δ may be used to scale the function linearly, for example so that the maximum reconstruction value is 1, if this is required by the reconstruction algorithm. It should be noted that all of these re-scaling functions may handle negative signal values, which may occur due to noise, but that $f_1$ (FIG. 6A) is undefined for larger negative values and needs to handle such cases separately. Another approach, for all re-scaling functions, would be to set $f(d_k)=0$ when $d_k<0$.

The above re-scaling functions are only given as examples, and the skilled person immediately realizes that many other viable choices for $f$ exist.

Figure 7:
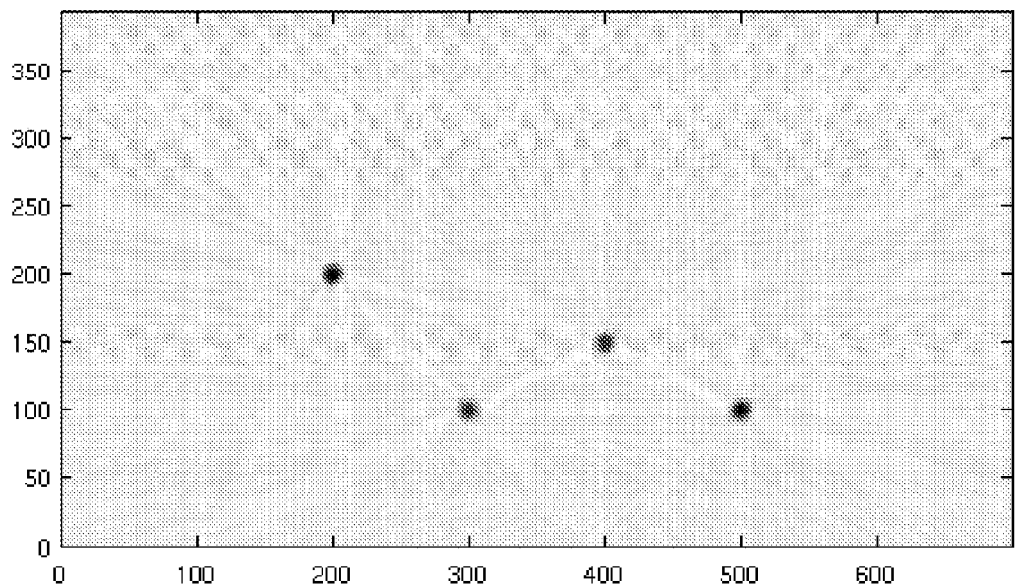
FIG. 7 illustrates a modified interaction pattern obtained by the first embodiment of data processing.

FIG. 7 illustrates the modified interaction pattern that is obtained by modifying the reconstruction values d that was processed for generation of the interaction pattern in FIG. 4A, where the reconstruction values are modified by applying $f(d_k)=\delta \cdot a \sin h(\gamma d_k)$, with $\gamma=10^7$. The modified interaction pattern in FIG. 7 has been generated by autoscaling the interaction pattern between minimum and maximum values. Compared to the actual interaction pattern in FIG. 4A, it is evident that both weakly and strongly interacting touches are readily identified in the modified interaction pattern, irrespective of noise and reconstruction artifacts.

It should be noted that the touch determination process no longer aims at reconstructing a close approximation of the true interaction pattern. This should be evident from the fact that the ratio between strongly and weakly interacting touches in the modified interaction pattern is likely to deviate significantly from the true ratio. In many situations, this is not a serious limitation, e.g. if the main task is to detect all touches and estimate their locations with high enough accuracy. If the absolute attenuation of touches is also required, this may be obtained in several ways. One way to reconstruct the actual attenuation of a touch would be to locally reconstruct the actual interaction pattern, by computing $\mathcal{P}'(d)$, at the required locations (e.g. inside the touch). If the function $\mathcal{P}'$ produces significant artifacts from stronger touches, a more accurate (with less artifacts) but more time-consuming reconstruction function $\mathcal{P}'$ may be applied to locally reconstruct the actual interaction pattern at the required locations. Another way would be to use the iterative compensation approach, described below, to suppress the contribution from all other touches in the reconstruction values d before doing the reconstruction. Yet another way would be to apply a compensating function, $f'$, to the modified interaction pattern, to counteract the effect of the re-scaling function $f$:

$$a'_1 = f'(\mathcal{P}'(f(d))).$$

It should be noted however, that in general the application of a non-linear re-scaling function $f$ results in a distortion of the reconstruction $\mathcal{P}'(f(d))$ which cannot be fully compensated by $f'$.

As noted in connection with the exemplifying re-scaling functions in FIGS. 6A-6C, the re-scaling function $f$ may have a parameter γ that controls which signal values are mapped approximately linearly and which are mapped non-linearly (scaled down). Such a control parameter γ may be set depending on the range of signal levels produced by strong and heavy touches, and/or the noise level. Typically, it may be a good idea to have the signal levels from the weakest touches in the (approximately) linearly mapped range, and stronger touches in the (significantly) non-linearly mapped range. Depending on implementation, the "signal values" may be projection values, reconstruction values or intermediate values.

4.2 Use of Iterative Compensation

Another main approach to enhance weakly interacting touches over strongly interacting touches in the interaction pattern, is to obtain a reference pattern on the touch surface and to identify the locations of all strongly interacting touches in the reference pattern. Then, the detection lines intersecting these locations are identified, and the projection values/intermediate values/reconstruction values for these detection lines are modified to reduce the contribution from the strongly interacting touches. In the following examples, it is assumed that modification is done on the reconstruction values for the intersecting detection lines.

The reference pattern should thus allow the locations of the strongly interacting touches to be determined. In the following examples, the reference pattern is obtained by operating the reconstruction algorithm on the reconstruction values d obtained from the projection values:

$$a_0 = \mathcal{P}'(d).$$

Thus, in a first reconstruction iteration, the actual interaction pattern $a_0$ is obtained for use as a reference pattern. As shown in FIG. 4A, the actual interaction pattern readily allows strong touches to be identified. Then, the modified reconstruction values d' are determined by suppressing or even removing, in the reconstruction values d, the contribution from the strong touches that were identified in the actual interaction pattern $a_0$. Thereafter, in a second reconstruction iteration, the reconstruction algorithm is operated on the modified reconstruction values d' to generate a modified interaction pattern, $a_1 = \mathcal{P}'(d')$, in which weakly interacting touches are enhanced over strongly interacting touches.

Figure 8:
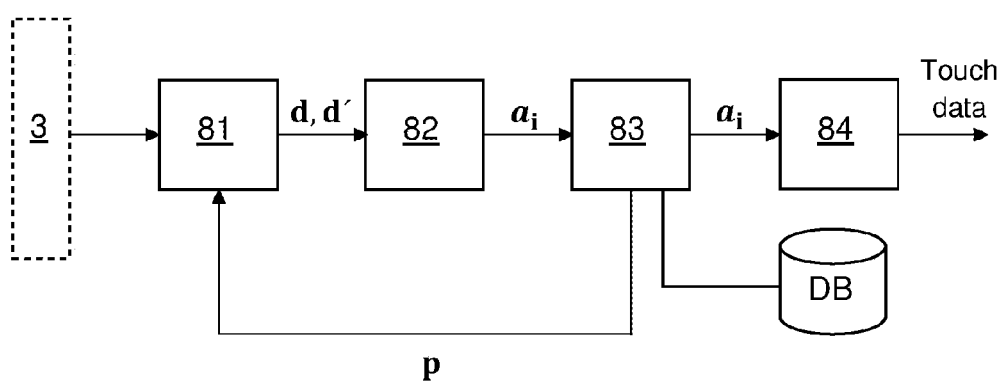
FIG. 8 is a block diagram of a structure for implementing a second embodiment of data processing.

FIG. 8 is a schematic block diagram of a processing structure for determining touch data using this iterative compensation approach. The processing structure comprises a block 81 which obtains the output signal from the light sensors 3 and generates the reconstruction values d for the different detection lines. A block 82, which is designed to control the iterative compensation, first operates the reconstruction algorithm on the reconstruction values d to generate the actual interaction pattern $a_0$. A block 83 analyzes the actual interaction pattern $a_0$ to identify all strong touches, and the detection lines affected by these strong touches. In this context "strong touches" may be defined as all touches that are identifiable in the actual interaction pattern $a_0$. Information p about the affected detection lines, and possibly a contribution value for each such detection line, is output by block 83 for use by block 81. Block 81 is configured to use the information p from block 83 to generate the modified reconstruction values d', whereupon block 82 operates the reconstruction algorithm on the modified reconstruction values d' to generate the modified interaction pattern $a_1$. A block 84 operates on the modified interaction pattern $a_1$, and possibly on the actual interaction pattern $a_0$, to determine touch data which is output for downstream processing or other use.

In one embodiment, the modified reconstruction values d' are generated by decreasing the reconstruction values for the affected detection lines by an estimated contribution of the strong touches to the respective reconstruction value (e.g. using the above-mentioned contribution value).

In an alternative embodiment, which requires less processing and which may be more robust, the modified reconstruction values d' are generated by setting the reconstruction values of the affected detection lines to a value that indicates a reduced interaction, e.g. by reducing these reconstruction values by a predetermined amount or percentage (fraction) or setting them to a predefined value. In one embodiment, the predefined value is selected such that the strong touches are essentially eliminated ("annihilated") in the subsequently modified interaction pattern. For example, the predefined value may be set to indicate that the affected detection lines are unaffected by touches altogether. If the reconstruction values are given by $d_k=-\log(T_k)$, the predefined value may be zero (0).

By using such a predefined criterion, information about the weak touches is also eliminated from the reconstruction values d, but in general enough information from the weaker touches remains in the modified reconstruction values d' to make the weaker touches detectable in the modified interaction pattern $a_1$ and allow good enough extraction of touch data.

Figure 9:
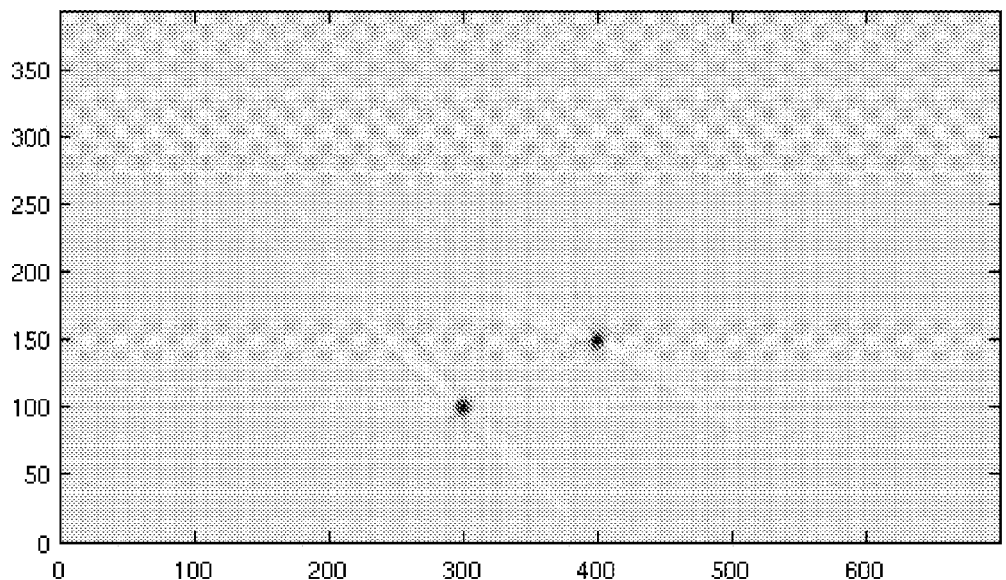
FIG. 9 illustrates a modified interaction pattern obtained by the second embodiment of data processing.

FIG. 9 illustrates the modified interaction pattern that is obtained by modifying the reconstruction values d that were processed for generation of the interaction pattern in FIG. 4A. In this example, the modified reconstruction values d' was obtained by setting all reconstruction values for the detection lines affected by the strong touches in FIG. 4A to zero. The modified interaction pattern in FIG. 9 has been generated by autoscaling the interaction pattern between minimum and maximum values. It is evident that the strongly interacting touches in the actual interaction pattern of FIG. 4A are missing, whereas both of the weakly interacting touches are readily identified in the modified interaction pattern. Thus, by having access to both the actual interaction pattern and the modified interaction pattern, block 84 (FIG. 8) is able to determine touch data for all objects on the touch surface.

It is to be understood that the iterative compensation approach may be used with any reconstruction algorithm $\mathcal{P}'$, and that it would be possible to configure the processing structure to perform further iterations, i.e. to generate further modified reconstruction values d" by removing the contribution from touches detected in the modified interaction pattern $a_1$, and to operate the reconstruction algorithm on the further modified reconstruction values d" to generate a further modified interaction pattern $a_2$, etc.

It is conceivable that the actual interaction pattern is pre-processed before being used as the reference pattern for identifying the detection lines that are affected by strong touches, for example for feature enhancement, noise reduction etc. In an alternative, the reference pattern is obtained from an actual interaction pattern determined in a preceding sensing instance.

Reverting to block 83 in FIG. 8, the strong touches may be identified by any known feature extraction technique, e.g. as discussed in relation to the extraction step 28 in FIG. 3A. Once the strong touches are identified, different techniques may be utilized to determine the detection lines that are affected by the strong touches.

In one embodiment, block 83 has access to a data structure DB (FIG. 8) that links regions on the touch surface to the detection lines that intersect the regions. For example, if the interaction pattern defines interaction values in a grid of reconstruction cells (pixels) on the touch surface, the data structure DB may associate each reconstruction cell, which has a certain position in the coordinate system of the touch surface, to a set of intersecting detection lines. Thereby, block 83 is able to map the reconstruction cells included in each strong touch to the data structure DB to identify the affected detection lines.

Figure 10:
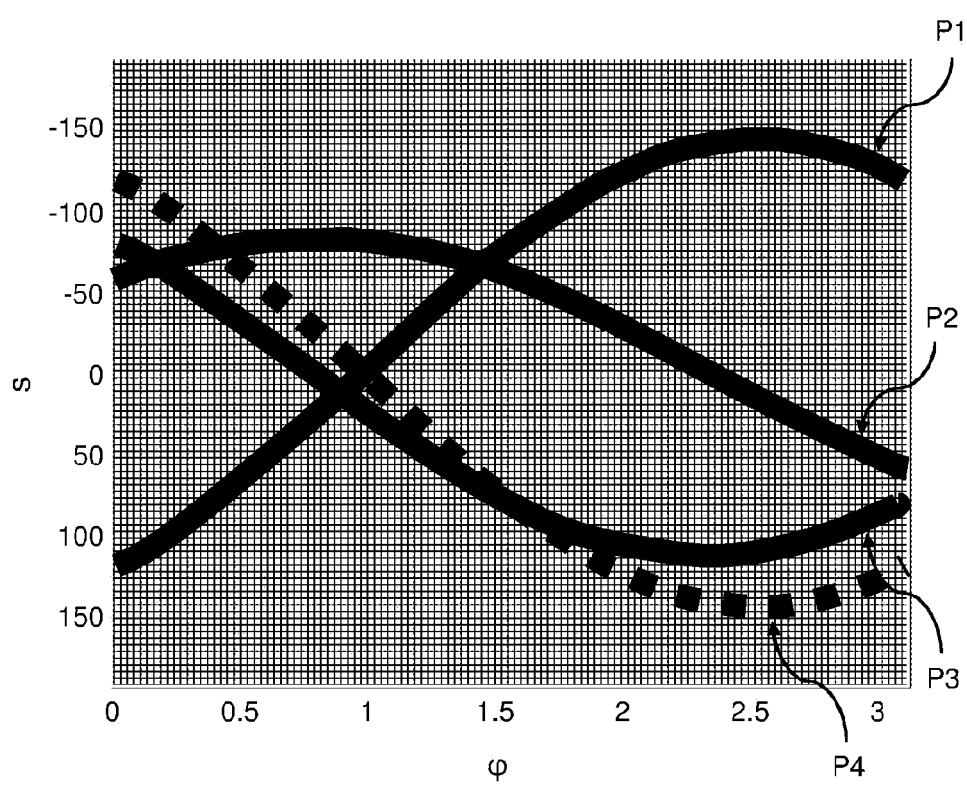
FIG. 10 is a sinogram obtained by mapping reconstruction values for available detection lines to a two-dimensional sample space.

In another embodiment, each detection line is defined by first and second dimension values in a two-dimensional sample space, such that the first and second dimension values define the location of the detection line on the touch surface. For example, in the realm of Filtered Back Projection (FBP), it is not uncommon to define detection lines in terms of a rotation angle φ of the detection line with respect to a reference direction, and a distance s of the detection line from a predetermined origin. It is also well-known that the reconstruction values may be mapped to a two-dimensional sample space, a (φ, s) plane, so as to form a so-called sinogram. An example of such a sinogram is shown in FIG. 10, in which each square represents a reconstruction value of a detection line. Each location on the touch surface corresponds to a predetermined sinus curve in the (φ, s) plane. FIG. 10 illustrates three such curves P1-P3 that correspond to three strong touches identified in an actual interaction pattern. In fact, each illustrated curve P1-P3 is composed of several curves for each reconstruction cell covered by the respective strong touch in the actual interaction pattern. Furthermore, each such curve is given a certain width in the s direction, so as to form a band in the (φ, s) plane. The width may be set in dependence of the size of the reconstruction cells in the interaction pattern.

It is realized that the affected detection lines may be identified by simply mapping the location of each strong touch in the interaction pattern to its corresponding curve P1-P3 in the (φ, s) plane, and by intersecting each curve P1-P3 with the detection lines as mapped to the (φ, s) plane. If the reconstruction values are mapped to form a sinogram in the (φ, s) plane, as shown in FIG. 10, the predetermined criterion may be applied at the same time as the mapping, e.g. by setting all reconstruction values intersected by the curves P1-P3 to a predetermined value, e.g. zero.

For comparison, FIG. 10 also includes a curve P4 (dotted line) that corresponds to a weak touch, which is not detectable in actual interaction pattern. It is realized that even if the reconstruction values of all affected detection lines are set to zero, a significant amount of reconstruction values remains along curve P4 enabling the reconstruction function to generate a modified interaction pattern in which the weak touch is detectable.

It should be realized that there are other parameter representations of the detection lines that may be used to define the sample space. For example, detection lines may be represented in a (β, α) plane, as is used in a fan geometry which is a standard geometry widely used in conventional tomography e.g. in the medical field. In such a standard geometry, the detection lines may be defined in terms of an angular location β of the incoupling or outcoupling point of the detection line with respect to a reference direction, and a rotation angle α of the detection line. Alternatively, the incoupling points and the outcoupling points may be given by respective unique indexes, whereby a first dimension of the sample space is given by an index of the incoupling points, and the second dimension of the sample space is given by an index of the outcoupling points.

5. Concluding Remarks

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

It is to be understood that the modified interaction pattern, and the actual interaction pattern if applicable, may be subjected to post-processing before touch data extraction (cf. step 28 in FIG. 3A). Such post-processing may involve different types of filtering, e.g. for noise removal and/or image enhancement.

The person skilled in the art realizes that there are other ways of generating reconstruction values based on the output signal. For example, each individual projection signal included in the output signal may be subjected to a high-pass filtering in the time domain, whereby the thus-filtered projection signals represent background-compensated energy and may be processed for generation of reconstruction values.

The interaction pattern may be generated to represent changes in interaction on the touch surface on any time scale. The foregoing examples result in a modified interaction pattern which is a distorted version of an actual interaction pattern that represents the current interaction on the touch surface, corresponding to changes in interaction on a long time scale, e.g. since startup or calibration of the touch-sensitive apparatus. In an alternative, the modified interaction pattern is generated as a distorted version of an actual interaction pattern that represents changes in interaction on a shorter time scale, e.g. in the approximate range of 1 ms-100 s or 5 ms-5 s. Furthermore, all the above embodiments, examples, variants and alternatives given with respect to an FTIR system are equally applicable to a touch-sensitive apparatus that operates by transmission of other energy than light. In one example, the touch surface may be implemented as an electrically conductive panel, the emitters and sensors may be electrodes that couple electric currents into and out of the panel, and the output signal may be indicative of the resistance/impedance of the panel on the individual detection lines. In another example, the touch surface may include a material acting as a dielectric, the emitters and sensors may be electrodes, and the output signal may be indicative of the capacitance of the panel on the individual detection lines. In yet another example, the touch surface may include a material acting as a vibration conducting medium, the emitters may be vibration generators (e.g. acoustic or piezoelectric transducers), and the sensors may be vibration sensors (e.g. acoustic or piezoelectric sensors).

The invention claimed is:

1. A method of enabling touch determination based on an output signal from a touch-sensitive apparatus, the touch-sensitive apparatus comprising a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal, the output signal being indicative of one or more touches on the surface portion, wherein the method comprises:
    obtaining the output signal which, if converted into a set of data samples of a given input format, enables a reconstruction algorithm to determine an actual interaction pattern on said surface portion;
    generating, based on the output signal, a modified set of data samples in said given input format; and
    operating the reconstruction algorithm on the modified set of data samples so as to determine a modified interaction pattern on said surface portion; wherein
        the modified interaction pattern represents an enhancement of weakly interacting touches over strongly interacting touches in the actual interaction pattern.

2. The method of claim 1, wherein
    each interaction pattern comprises a distribution of interaction values within at least part of the surface portion; and
    each of the interaction values indicates a local attenuation of energy.

3. The method of claim 1, wherein
    said set of data samples represents an actual degree of interaction between the one or more touches on the surface portion and the detection lines; and
    the generating the modified set of data samples includes actively modifying the actual degree of interaction for at least part of the detection lines.

4. The method of claim 3, wherein said actively modifying comprises:
    changing a mutual relation in the actual degree of interaction among different detection lines.

5. The method of claim 3, wherein said actively modifying comprises:
    relatively decreasing the actual degree of interaction for the detection lines with the highest actual degree of interaction.

6. The method of claim 1, wherein said generating the modified set of data samples comprises:
    obtaining, based on the output signal, a magnitude value for each detection line; and
    applying a re-scaling function to the magnitude values for the detection lines.

7. The method of claim 6, wherein the re-scaling function is non-linear and has a decreasing derivate with increasing magnitude value, at least for non-negative magnitude values.

8. The method of claim 6, wherein
    the re-scaling function is defined by a set of control parameters; and
    the method further includes
        setting at least one of the control parameters based on the magnitude values for the detection lines.

9. The method of claim 1, further comprising:
    obtaining, based on the output signal, a magnitude value for each detection line;
    obtaining a reference interaction pattern on the surface portion;
    identifying a location of a strongly interacting touch in the reference interaction pattern;
    identifying a set of detection lines intersecting said location; and
    actively modifying the magnitude values for the set of detection lines.

10. The method of claim 9, wherein the generating the modified set of data samples comprises at least one of:
    changing the magnitude values for the set of detection lines;
    setting the magnitude values for the set of detection lines to a predefined value according to a predefined criterion; and
    decreasing the magnitude values for the set of detection lines by an estimated contribution of the strongly interacting touches.

11. The method of claim 9, wherein the obtaining the reference interaction pattern comprises:
    operating the reconstruction algorithm on the set of data samples so as to generate the actual interaction pattern; and
    obtaining the reference interaction pattern based on the actual interaction pattern.

12. The method of claim 9, wherein the identifying the set of detection lines comprises:
    accessing a data structure that links regions on the surface portion to the detection lines that intersect the regions.

13. The method of claim 9, wherein
    each detection line is defined by first and second dimension values in a two-dimensional sample space;

the first and second dimension values define the location of the detection line on the surface portion; and the identifying the set of detection lines includes
mapping the location of the strongly interacting touch to a curve in the two-dimensional sample space, and
identifying the set of intersecting detection lines by intersecting the curve with the detection lines as mapped to the two-dimensional sample space.

14. The method of claim 6, wherein the magnitude values for the detection lines indicate a degree of interaction between the one or more touches on the surface portion and the detection lines.

15. The method of claim 6, wherein the magnitude values for the detection lines represent the set of data samples.

16. The method of claim 1, further comprising:
repeatedly executing
the obtaining the output signal,
the generating the modified set of data samples,
the operating the reconstruction algorithm on the modified set of data samples,
determining touch data based on the modified interaction pattern, and
outputting the touch data.

17. The method of claim 1, wherein the output signal represents detected signal energy on respective detection lines.

18. The method of claim 1, wherein said input format represents a decrease in signal energy caused by interaction between one or more of the touches on the surface portion and one of the detection lines.

19. The method of claim 1, wherein
said input format is represented by a function of detected signal energy for a respective detection line normalized by a reference value; and
the reference value represents the detected signal energy on the respective detection line without touches on the surface portion.

20. The method of claim 19, wherein said input format is given by operating a logarithm function on the detected signal energy for the respective detection line normalized by the reference value.

21. The method of claim 1, wherein the reconstruction algorithm is designed for tomographic reconstruction based on data in said input format.

22. A non-transitory computer readable medium comprising computer code which, when executed on a data-processing system, is adapted to carry out the method of claim 1.

23. A device for enabling touch determination based on an output signal from a touch-sensitive apparatus, the touch-sensitive apparatus comprising a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal, the output signal being indicative of one or more touches on the surface portion, said device comprising a signal processor configured to:
obtain the output signal which, if converted into a set of data samples of a given input format, enables a reconstruction algorithm to determine an actual interaction pattern on said surface portion;
generate, based on the output signal, a modified set of data samples in said given input format; and
operate the reconstruction algorithm on the modified set of data samples to determine a modified interaction pattern on said surface portion; wherein
the modified interaction pattern represents an enhancement of weakly interacting touches over strongly interacting touches in the actual interaction pattern.

24. A touch-sensitive apparatus, comprising:
a panel configured to conduct signals from a plurality of incoupling points to a plurality of outcoupling points, thereby defining detection lines that extend across a surface portion of the panel between pairs of incoupling and outcoupling points;
at least one signal generator coupled to the incoupling points to generate the signals;
at least one signal detector coupled to the outcoupling points to generate an output signal, the output signal being indicative of one or more touches on the surface portion; and
a signal processor connected to receive the output signal and configured to
obtain the output signal which, if converted into a set of data samples of a given input format, enables a reconstruction algorithm to determine an actual interaction pattern on said surface portion,
generate, based on the output signal, a modified set of data samples in said given input format, and
operate the reconstruction algorithm on the modified set of data samples so as to determine a modified interaction pattern on said surface portion, wherein
the modified interaction pattern represents an enhancement of weakly interacting touches over strongly interacting touches in the actual interaction pattern.

* * * * *